US009809008B2

(12) United States Patent
Masui et al.

(10) Patent No.: US 9,809,008 B2
(45) Date of Patent: Nov. 7, 2017

(54) LAMINATE

(75) Inventors: Toshiaki Masui, Settsu (JP); Tomihiko Yanagiguchi, Settsu (JP); Mayuko Taeda, Settsu (JP); Takeshi Inaba, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/381,293

(22) PCT Filed: May 19, 2010

(86) PCT No.: PCT/JP2010/058458
§ 371 (c)(1),
(2), (4) Date: Dec. 28, 2011

(87) PCT Pub. No.: WO2011/001756
PCT Pub. Date: Jan. 6, 2011

(65) Prior Publication Data
US 2012/0107617 A1    May 3, 2012

(30) Foreign Application Priority Data

| Jun. 30, 2009 | (JP) | ................................. | 2009-156022 |
| Jul. 31, 2009 | (JP) | ................................. | 2009-179866 |
| Feb. 15, 2010 | (JP) | ................................. | 2010-030506 |
| Apr. 28, 2010 | (JP) | ................................. | 2010-104282 |

(51) Int. Cl.
| B32B 25/08 | (2006.01) |
| B32B 7/04  | (2006.01) |
| B32B 7/10  | (2006.01) |
| B32B 25/14 | (2006.01) |
| B32B 27/30 | (2006.01) |
| F16L 11/04 | (2006.01) |

(52) U.S. Cl.
CPC ............... *B32B 25/08* (2013.01); *B32B 7/10* (2013.01); *B32B 25/14* (2013.01); *B32B 27/304* (2013.01); *B32B 2250/02* (2013.01); *B32B 2250/03* (2013.01); *B32B 2250/24* (2013.01); *B32B 2264/102* (2013.01); *B32B 2264/108* (2013.01); *B32B 2264/12* (2013.01); *B32B 2305/77* (2013.01); *B32B 2307/306* (2013.01); *B32B 2307/51* (2013.01); *B32B 2307/714* (2013.01); *B32B 2307/7265* (2013.01); *B32B 2307/738* (2013.01); *B32B 2605/00* (2013.01); *F16L 11/04* (2013.01); *F16L 2011/047* (2013.01); *Y10T 428/31544* (2015.04)

(58) Field of Classification Search
None
See application file for complete search history.

(56) References Cited

U.S. PATENT DOCUMENTS

| 4,606,952 A * | 8/1986 | Sugimoto | ............... B32B 25/14 |
| | | | 428/36.8 |
| 4,828,923 A * | 5/1989 | Nakagawa | ............... B32B 25/00 |
| | | | 428/421 |
| 6,482,522 B1 * | 11/2002 | Parsonage et al. | ........... 428/421 |
| 2005/0000582 A1 * | 1/2005 | Okado et al. | ................ 138/137 |
| 2007/0026177 A1 * | 2/2007 | Kitahara et al. | ........... 428/36.91 |
| 2007/0231522 A1 | 10/2007 | Sakazaki et al. | |
| 2007/0248779 A1 | 10/2007 | Iio et al. | |
| 2008/0241449 A1 | 10/2008 | Fukaya et al. | |
| 2010/0075089 A1 | 3/2010 | Inaba et al. | |

FOREIGN PATENT DOCUMENTS

| CN | 1282347 A | 1/2001 |
| JP | 7-266501 A | 10/1995 |
| JP | 2001-526972 A | 12/2001 |
| JP | 2001-527104 A | 12/2001 |
| JP | 2001-527104 A | 12/2001 |
| JP | 2004-150457 A | 5/2004 |
| JP | 2005-22403 A | 1/2005 |
| JP | 2007-261079 A | 10/2007 |
| JP | 2008-265273 A | 11/2008 |
| WO | WO 2008/041643 A1 | 4/2008 |
| WO | 2008-254178 A | 10/2008 |

OTHER PUBLICATIONS

International Search Report of PCT/JP2010/058458, dated Jul. 20, 2010.
Extended European Search Report dated Mar. 4, 2014 for EP Appln. No. 10793927.4.

* cited by examiner

*Primary Examiner* — Callie Shosho
*Assistant Examiner* — Patrick English
(74) *Attorney, Agent, or Firm* — Sugrue Mion, PLLC

(57) ABSTRACT

A laminate of a rubber layer (A) and a fluororesin layer (B) on the rubber layer (A), wherein the rubber layer (A) is a layer made of a rubber composition for vulcanization, the rubber composition for vulcanization contains an unvulcanized rubber (a1); at least one compound (a2) selected from the group consisting of a 1,8-diazabicyclo(5.4.0)undec-7-ene salt, a 1,5-diazabicyclo(4.3.0)-non-5-ene salt, 1,8-diazabicyclo(5.4.0)undec-7-ene, and 1,5-diazabicyclo(4.3.0)-non-5-ene; magnesium oxide (a3); and silica (a4), the amount of the compound (a2) is larger than 1.0 part by mass and not larger than 5.0 parts by mass, for each 100 parts by mass of the unvulcanized rubber (a1), the fluororesin layer (B) is a layer made of a fluoropolymer composition, and the fluoropolymer composition contains a fluoropolymer (b1) having a copolymer unit derived from chlorotrifluoroethylene.

9 Claims, No Drawings

LAMINATE

CROSS REFERENCE TO RELATED APPLICATIONS

This application is a National Stage of International Application No. PCT/JP2010/058458 filed May 19, 2010, claiming priority based on Japanese Patent Application No. 2009-156022 filed Jun. 30, 2009, Japanese Patent Application No. 2009-179866 filed Jul. 31, 2009, Japanese Patent Application No. 2010-030506 filed Feb. 15, 2010, and Japanese Patent Application No. 2010-104282 filed Apr. 28, 2010, the contents of all of which are incorporated herein by reference in their entirety.

TECHNICAL FIELD

The present invention relates to a laminate.

BACKGROUND ART

Growing environmental awareness has led to recent improvement in legal systems for controlling the fuel volatility. Especially in the automotive industry, the fuel volatility control is seriously demanded particularly in the United States. This demand has raised needs for materials having excellent fuel-barrier properties.

In particular, common rubber hoses for fuel transfer are laminate hoses (rubber is used except for a barrier layer) having a barrier layer made of a fluororesin for enhancing the fuel permeability resistance. Recent strong demand for reduction in environmental loads has raised needs for lower fuel permeability of the barrier layer. To achieve this, increase in the barrier layer thickness and use of a perhalogen fluororesin that has the lowest permeability among fluororesins have been considered as means for ensuring lower permeability. However, increase in the barrier layer (fluororesin) thickness leads to increase in the hose weight and is also disadvantageous from the standpoint of energy conservation. Additionally, bendability (flexibility) of the hose is lowered, which is disadvantageous in terms of handleability (assembling property).

In the case that a perhalogen fluororesin is used in a barrier layer, the barrier layer is not easily adhered with a rubber of inner and outer layers. This requires an additional step such as a step of surface treatment of the resin for improving the adhesiveness and a step of winding a film or tape around the layer. Such a complicated process significantly lowers the productivity and also greatly increases the cost, which are practically disadvantageous.

Patent Document 1, for example, discloses use of epoxidized rubber or a blended material containing epoxidized rubber and another rubber in a rubber layer, as a method for enhancing the adhesion between a fluororesin layer and a rubber layer. Further, as disclosed in Patent Document 2, another known method for improving the adhesion is using a thermoplastic fluororesin having a reactive functional group such as a carbonyl group as a fluororesin and adding a polyfunctional compound such as triallyl isocyanurate to at least one of the thermoplactic fluororesin and a rubber layer for direct adhesion between the fluororesin and rubber.

Patent Document 3 discloses a fuel hose having a layered structure in which a diene rubber layer and a vinylidene fluoride copolymer (THV) layer are adjacent to each other. The diene rubber layer comprises a diene rubber such as NBR added with a sulfur vulcanizing agent, at least one of a metal calbamate and a thiazole metal salt, and magnesium oxide, along with a DBU salt and the like.

As disclosed in Patent Documents 4 and 5, adhesiveness of a curable elastomeric compound to a fluoropolymer layer may be enhanced by using a fluoropolymer having at least one monomer unit containing a plurality of hydrogen atoms or a fluoropolymer essentially containing a vinylidene fluoride unit and blending a dehydrofluorinating composition therein.

[Patent Document 1] JP-A 7-266501
[Patent Document 2] JP-A 2005-22403
[Patent Document 3] JP-A 2007-261079
[Patent Document 4] JP-T 2001-527104
[Patent Document 5] JP-T 2001-526972

SUMMARY OF THE INVENTION

Problems to be Solved by the Invention

The present invention is aimed to provide a vulcanized laminate in which a rubber layer and a fluororesin layer are firmly adhered to each other without using an adhesive or performing a surface treatment on the rubber layer and the fluororesin layer.

Means for Solving the Problems

The present invention relates to a laminate comprising a rubber layer (A) and a fluororesin layer (B) on the rubber layer (A), wherein the rubber layer (A) is a layer made of a rubber composition for vulcanization, the rubber composition for vulcanization contains an unvulcanized rubber (a1); at least one compound (a2) selected from the group consisting of a 1,8-diazabicyclo(5.4.0)undec-7-ene salt, a 1,5-diazabicyclo(4.3.0)-non-5-ene salt, 1,8-diazabicyclo(5.4.0)undec-7-ene, and 1,5-diazabicyclo(4.3.0)-non-5-ene; magnesium oxide (a3); and silica (a4), the amount of the compound (a2) is larger than 1.0 part by mass and not larger than 5.0 parts by mass, for each 100 parts by mass of the unvulcanized rubber (a1), the fluororesin layer (B) is a layer made of a fluoropolymer composition, and the fluoropolymer composition contains a fluoropolymer (b1) having a copolymer unit derived from chlorotrifluoroethylene.

Effect of the Invention

In lamination of a fluororesin layer and a rubber layer of the laminate of the present invention, chemically-firm adhesion is obtained during vulcanization of rubber without complicated procedures. Therefore, special procedures for adhering are not needed. This allows easy forming at low cost. In addition, since a common forming method such as extrusion can be employed, thinner products can be produced so that the flexibility is improved.

MODES FOR CARRYING OUT THE INVENTION

The laminate of the present invention has a rubber layer (A) and a fluororesin layer (B) on the rubber layer (A).

In the following, description is given on each layer.

(A) Rubber Layer

The rubber layer (A) is made of a rubber composition for vulcanization.

The rubber composition for vulcanization contains, as essential components, an unylucanized rubber (a1), a compound (a2), magnesium oxide (a3), and silica (a4), and may further contain, as optional components, at least one of a vulcanizing agent (a5) and a metal salt (a6). Especially in the case that the rubber composition for vulcanization contains, in addition to the unvulcanized rubber (a1) and the compound (a2), the vulcanizing agent (a5) and the metal salt (a6), the layer (A) and the layer (B) can be adhered to each other more strongly.

Though a fluororubber may be used as the unvulcanized rubber (a1), the unylucanized rubber (a1) is preferably a fluorine-free rubber because it is excellent in cold resistance and cost effective.

Specific examples of the fluorine-free rubber include diene rubbers such as acrylonitrile-butadiene rubber (NBR) and its hydride (HNBR), styrene-butadiene rubber (SBR), chloroprene rubber (CR), butadiene rubber (BR), natural rubber (NR), and isoprene rubber (IR); ethylene-propylene-termonomer copolymer rubber, silicone rubber, butyl rubber, epichlorohydrin rubber, and acrylic rubbers.

The unvulcanized rubber (a1) is preferably a diene rubber and is more preferably NBR because of its fine thermal resistance, oil resistance, weather resistance, and extrudability.

The rubber composition for vulcanization may contain a resin for providing the rubber layer (A) with another property other than the property given by the unvulcanized rubber (a1). Examples of the resin include PVC, chlorinated polystyrene, chlorosulfonated polystyrene ethylene, and ethylene-vinyl acetate copolymers. In the case that the rubber composition for vulcanization contains NBR and PVC, for example, the ozone resistance can be enhanced. In such a case, the amount of PVC is preferably 10 to 70 parts by mass for each 100 parts by mass of NBR.

The compound (a2) is at least one compound selected from the group consisting of a 1,8-diazabicyclo(5.4.0)un-dec-7-ene salt (DBU salt), a 1,5-diazabicyclo(4.3.0)-non-5-ene salt (DBN salt), 1,8-diazabicyclo(5.4.0)undec-7-ene (DBU), and 1,5-diazabicyclo(4.3.0)-non-5-ene (DBN). The compound (a2) improves the vulcanization property of the rubber composition for vulcanization.

Examples of the DBU salt and the DBN salt include a carbonate, a long chain aliphatic carboxylate, an aromatic carboxylate, an orthophthalate, a p-toluenesulfonate, a phenoxide, a phenol resin salt, a naphthoate, an octoate, an oleate, a formate, and a phenolic novolac resin salt of DBU and DBN. The DBU or DBN salt is preferably at least one compound selected from the group consisting of 1,8-benzyl-1,8-diazabicyclo(5.4.0)-7-undecenium chloride (DBU-B), a naphthoate, an orthophtalate, a phenoxide, and a formate.

More specifically, the compound (a2) is preferably at least one compound selected from the group consisting of 1,8-diazabicyclo(5.4.0)undec-7-ene, 1,8-benzyl-1,8-diazabicy-clo(5.4.0)-7-undecenium chloride, 1,8-diazabicyclo(5.4.0) undec-7-ene naphthoate, 1,8-diazabicyclo(5.4.0)undec-7-ene phenoxide, 1,8-diazabicyclo(5.4.0)undec-7-ene orthophthalate, and 1,8-diazabicyclo(5.4.0)undec-7-ene formate.

The compound (a2) is more preferably at least one compound selected from the group consisting of 1,8-diazabicyclo(5.4.0)undec-7-ene, 1,8-benzyl-1,8-diazabicyclo (5.4.0)-7-undecenium chloride, 1,8-diazabicyclo(5.4.0)un-dec-7-ene phenoxide, 1,8-diazabicyclo(5.4.0)undec-7-ene orthophthalate, and 1,8-diazabicyclo(5.4.0)undec-7-ene formate. Moreover, the compound (a2) is still more preferably at least one compound selected from the group consisting of 1,8-benzyl-1,8-diazabicyclo(5.4.0)-7-undecenium chloride and 1,8-diazabicyclo(5.4.0)undec-7-ene formate.

In the case that DBU naphthoate is solely used, a comparatively large amount of the compound (a2) may be needed for achieving excellent adhesiveness. In contrast, in the case that DBU-B is used, the amount can be reduced.

The compound (a2) preferably is DBU-B as an essential component. More preferably, the compound (a2) is DBU-B alone, a combination of DBU-B and DBU phenoxide, a combination of DBU-B and DBU orthophthalate, a combination of DBU-B and DBU formate, a combination of DBU-B and DBU, or a combination of DBU-B and DBU naphthoate. As above, essential use of DBU-B reduces the amount of the compound (a2).

Another preferable embodiment of the compound (a2) is DBU-B, DBU, or a combination of DBU naphthoate and at least one compound selected from the group consisting of DBU-B, DBU phenoxide, DBU orthophtalate, and DBU formate.

The amount of the compound (a2) is more than 1.0 part by mass and not more than 5.0 parts by mass for each 100 parts by mass of the unvulcanized rubber (a1). The amount of the compound (a2) is preferably 1.5 parts by mass or more for each 100 parts by mass of the unvulcanized rubber (a1). If the amount is too small, the adhesion force may be insufficient. The amount of the compound (a2) is preferably 3.1 parts by mass or less, more preferably 3.0 parts by mass or less, and still more preferably 2.0 parts by mass or less, for each 100 parts by mass of the unvulcanized rubber (a1).

The vulcanizing agent (a5) may be a conventionally known one selected in accordance with the vulcanizing system of the rubber composition for vulcanization. Vulcanization of the unylucanized rubber (a1) enhances the mechanical strength such as tensile strength of the obtained vulcanized rubber layer and provides the vulcanized rubber layer with fine elasticity.

The vulcanizing system usable in the present invention is any of sulfur vulcanizing system, polyamine vulcanizing system, polyol vulcanizing system, peroxide vulcanizing system, imidazole vulcanizing system, triazine vulcanizing system, oxazole vulcanizing system, and thiazole vulcanizing system. It may be appropriately selected in accordance with the type of a vulcanizable group (cure site) in the case that the unvulcanized rubber contains a cure site, and also in accordance with the properties to be given to the vulcanized laminate and the application thereof.

The vulcanizing agent (a5) may be any of a sulfur vulcanizing agent, a polyamine vulcanizing agent, a polyol vulcanizing agent a peroxide vulcanizing agent, an imidazole vulcanizing agent, a triazine vulcanizing agent, an oxazole vulcanizing agent, and a thiazole vulcanizing agent. Each of these may be used alone, or two or more of these may be used in combination.

In the case that the unvulcanized rubber (a1) is a diene-type, fluorine-free rubber (e.g. NBR, SBR, BR), for example, since sulfur vulcanizing system and peroxide vulcanizing system are commonly employed, the vulcanizing agent is preferably at least one agent selected from the group consisting of a sulfur vulcanizing agent and a peroxide vulcanizing agent.

Examples of the sulfur vulcanizing agent include powdered sulfur, precipitated sulfur, colloidal sulfur, surface-treated sulfur, insoluble sulfur, sulfur chloride, sulfur dichloride, a disulfide compound, and a polysulfide compound.

The amount of the sulfur vulcanizing agent is preferably 1.0 to 10.0 parts by mass for each 100 parts by mass of the unvulcanized rubber (a1). If the amount is too small, the adhesion may be insufficient. If the amount is too large, the laminate may be too rigid.

Preferable examples of the peroxide vulcanizing agent include an organic peroxide easily generating peroxide radicals in the presence of heat or a redox system.

Examples of the organic peroxide include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α, α'-bis(t-butylperoxy)-p-diisopropyl benzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di (benzoylperoxy)hexane, t-butyl peroxymaleic acid, and t-butylperoxy isopropyl carbonate. Preferable among these is a dialkyl compound. Commonly, the type and the amount of the organic peroxide are determined in accordance with the amount of the active —O=O—, the degradation temperature and the like. The amount is commonly 0.1 to 15.0 parts by mass and preferably 0.3 to 5.0 parts by mass for each 100 parts by mass of the unvulcanized rubber.

The vulcanizing agent (a5) is preferably at least one agent selected from the group consisting of a sulfur vulcanizing agent and a peroxide vulcanizing agent, and more preferably a sulfur vulcanizing agent. The amount of the vulcanizing agent (a5) is preferably 0.5 to 5.0 parts by mass and particularly preferably 1.0 to 3.0 parts by mass, for each 100 parts by mass of the unvulcanized rubber (a1).

The metal salt (a6) is preferably one kind selected from the group consisting of a metal calbamate and a thiazole metal salt.

Examples of the metal calbamate include zinc dimethyldithiocarbamate (ZnMDC), zinc diethyldithiocarbamate (ZnEDC), zinc dibutyldithiocarbamate (ZnBDC), iron dimethyldithiocarbamate (FeMDC), zinc ethylphenyldithiocarbamate (ZnEPDC), zinc N-pentamethylenedithiocarbamate, zinc dibenzyldithiocarbamate, sodium dimethyldithiocarbamate (NaMDC), sodium diethyldithiocarbamate (NaEDC), sodium dibutyldithiocarbamate (NaBDC), copper dimethyldithiocarbamate (CuMDC), and tellurium diethyldithiocarbamate (TeEDC). Each of these may be used alone, or two or more of these may be used in combination. Among these, ZnMDC, ZnEDC, or ZnBDC is favorably used from the standpoint of adhesiveness and rubber properties.

As the thiazole metal salt, zinc mercaptobenzothiazole (ZnMBT) is favorably used.

The amount of the metal salt (a6) is preferably 0.01 to 3.0 parts by mass, more preferably 0.01 to 0.5 parts by mass, and particularly preferably 0.05 to 0.3 parts by mass, for each 100 parts by mass of the unvulcanized rubber (a1). If the amount is too small, the properties of the vulcanized rubber tend to be deteriorated. If the amount is too large, unvulcanized rubber properties tend to be deteriorated.

The rubber composition for vulcanization contains magnesium oxide (a3). The amount of the magnesium oxide (a3) is preferably 3 to 20 parts by mass and particularly preferably 5 to 15 parts by mass from the standpoint of adhesiveness and rubber properties, for each 100 parts by mass of the unvulcanized rubber (a1). The laminate having a specific structure of the present invention is allowed to have excellent adhesiveness by essentially containing the magnesium oxide (a3).

The rubber composition for vulcanization contains silica (a4). The silica (a4) may be basic silica or acid silica. From the standpoint of adhesiveness, the silica (a4) is preferably basic silica. Examples of the basic silica include Carplex 1120 (product of DSL. Japan Co., Ltd.). From the standpoint of adhesiveness and rubber properties, the amount of the silica (a4) is preferably 10 to 40 parts by mass and particularly preferably 15 to 25 parts by mass, for each 100 parts by mass of the unvulcanized rubber (a1). The laminate having a specific structure of the present invention is allowed to have excellent adhesiveness by essentially containing the silica (a4).

Preferably, the rubber composition for vulcanization does not contain an amine compound as it may inhibit vulcanizing properties and deteriorate rubber properties.

In the present invention, additives commonly used in preparing rubber compositions for vulcanization may be added in accordance with purposes and needs. Examples of the common additives include fillers, processing aids, plasticizers, softeners, age inhibitors, colorants, stabilizers, adhesion aids, mold releasing agents, conductivity imparting agents, thermal conductivity imparting agents, anti-tackifiers for surfaces, tackifiers, flexibility imparting agents, thermal resistance improvers, flame retardants, UV absorbents, oil resistance improvers, foaming agents, antiscorching agents, lubricants, and epoxy resins. Further, one or two or more common vulcanizing agents or vulcanization accelerators other than the above mentioned agents may be added. Here, the amount of these additives should be within the range that would not deteriorate the adhesiveness of the fluororesin layer (B) which is intended to be improved in the present invention.

Examples of the fillers include: metal oxides such as calcium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthesized hydrotalcite; metal sulfides such as molybdenum disulfide, iron sulfide, and copper sulfide; diatom earth, asbestos, lithopone (zinc sulfide/barium sulfide), graphite, carbon black, carbon fluoride, calcium fluoride, coke, quarts fine powder, zinc flower, talc, mica powder, wollastonite, carbon fiber, alamido fiber, various whiskers, glass fiber, organic stiffeners, and organic fillers.

Examples of the processing aids include: higher fatty acids such as stearic acid, oleic acid, palmitic acid, and lauric acid; higher fatty acid salts such as sodium stearate and zinc stearate; higher fatty acid amides such as stearic amide and oleic amide; higher fatty acid esters such as ethyl oleate; higher fatty amines such as stearylamine and oleylamine; petroleum waxes such as carnauba wax and ceresin wax; polyglycols such as ethylene glycol, glycerol, and diethylene glycol; aliphatic hydrocarbons such as vaseline and paraffin; silicone oils, silicone polymers, low molecular weight polyethylene, phthalate esters, phosphate esters, rosin, (halogenated) dialkyl amines, (halogenated) dialkyl sulfones, and surface active agents.

Examples of the plasticizers include phthalic acid derivatives and sebacic acid derivatives. Examples of the softeners include lubricant oil, process oil, coal tar, castor oil, and calcium stearate. Examples of the age inhibitors include phenylenediamines, phosphates, quinolines, cresols, phenols, and dithiocarbamate metal salts.

Examples of the epoxy resins include bisphenol A-type epoxy resins, bisphenol F-type epoxy resins, and polyfunctional epoxy resins. Among these, the bisphenol A-type epoxy resins are preferable as they are excellent in chemical resistance and adhesiveness. Further, the bisphenol A-type epoxy resin represented by Formula (1):

[Chem. 1]

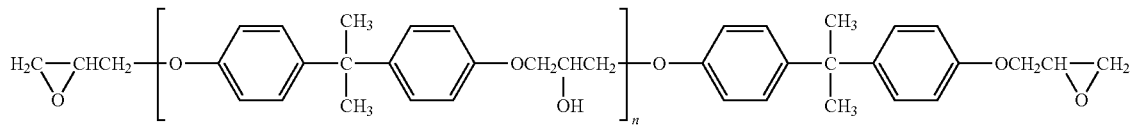

(1)

is particularly preferable. In Formula (1), n is the average value and is preferably 0.1 to 3, more preferably 0.1 to 0.5, and still more preferably 0.1 to 0.3. If n is less than 0.1, the adhesiveness with the fluororesin (b) tends to be lowered. If n exceeds 3, the viscosity of the epoxy resin itself increases and such an epoxy resin may be hardly uniformly dispersed in the rubber composition for vulcanization.

In the case that an epoxy resin is added, the amount thereof is preferably not less than 1 part by mass, more preferably not less than 2 parts by mass, and particularly preferably 3 parts by mass, for each 100 parts by mass of the unvulcanized rubber in order to further improve the adhesiveness. From the standpoint of avoiding a too-hard rubber layer, the amount is preferably not more than 25 parts by mass, more preferably not more than 15 parts by mass, and particularly preferably not more than 10 parts by mass, for each 100 parts by mass of the unvulcanized rubber.

The rubber composition for vulcanization is prepared by compounding the unvulcanized rubber (a1), the compound (a2), the magnesium oxide (a3), and the silica (a4), and if needed, the vulcanizing agent (a5), the metals salt (a6) and other additives.

Compounding may be performed by using an open roll mixer, banbury mixer, pressure kneader or the like at a temperature of not higher than 100° C.

The optimal vulcanizing time ($T_{90}$) of the rubber composition for vulcanization is preferably not longer than 18 minutes. The optimal vulcanizing time ($T_{90}$) is more preferably not longer than 15 minutes, still more preferably not longer than 13 minutes, and particularly preferably not longer than 11 minutes. The lower limit of $T_{90}$ is not particularly limited, and may be not shorter than one minute, for example. The rubber composition for vulcanization having a composition as described above can shorten the vulcanization time and improve the productivity. $T_{90}$ is a Value obtained by measuring the maximum torque value ($M_H$) and the minimum torque value ($M_L$) at 160° C. and using a formula $\{(M_H)-(M_L)\} \times 0.9 + M_L$. Here, $M_H$ and $M_L$ are measured in accordance with JIS K 6300-2.

Next, the fluororesin layer (B) in the laminate of the present invention is described.

(B) Fluororesin Layer

The fluororesin layer (B) is made of a fluoropolymer composition.

The fluoropolymer composition at least contains a fluoropolymer (b1) having a copolymer unit derived from chlorotrifluoroethylene.

The fluoropolymer (b1) is preferably a fluororesin. More specifically, the fluoropolymer (b1) is preferably at least one selected from the group consisting of polychlorotrifluoroethylene (PCTFE) and a CTFE copolymer.

The CTFE copolymer preferably contains a copolymer unit derived from CTFE (CTFE unit) and a copolymer unit derived from at least one monomer selected from the group consisting of tetrafluoroethylene (TFE), hexafluoropropylene (HFP), perfluoro(alkylvinylether) (PAVE), vinylidene fluoride (VdF), vinyl fluoride, hexafluoroisobutene, a monomer represented by the formula: $CH_2=CX^1(CF_2)_nX^2$ (in the formula, $X^1$ representing H or F, $X^2$ representing H, F, or Cl, and n representing an integer of 1 to 10), ethylene, propylene, 1-butene, 2-butene, vinyl chloride, and vinylidene chloride.

The CTFE copolymer more preferably contains a CTFE unit and a copolymer unit derived from at least one monomer selected from the group consisting of TFE, HFP, and PAVE. Further, the CTFE copolymer still more preferably substantially contains only these copolymer units. In terms of lower fuel permeability, it is preferable that the CTFE copolymer does not contain a monomer having a CH bond such as ethylene, vinylidene fluoride and vinyl fluoride. Commonly, a perhalopolymer is hardly adhered to rubber. In accordance with the structure of the present invention, however, adhesion between the fluororesin layer and the rubber layer is strong even when the fluororesin layer is made of perhalopolymers.

The CTFE copolymer preferably has the CTFE unit in an amount of 10 to 90 mol % of the entire monomer units.

The CTFE copolymer particularly preferably contains a CTFE unit, a TFE unit, and a monomer (α) unit derived from a monomer (α) copolymerizable with the above units.

The "CTFE unit" and the "TFE unit" are a part derived from CTFE (—CFCl—CF$_2$—) and a part derived from TFE (—CF$_2$—CF$_2$—) respectively, in the molecular structure of the CTFE copolymer. Similarly, the "monomer (α) unit" is a part where a monomer (α) is added in the molecular structure of the CTFE-based copolymer.

The monomer (α) is not particularly limited as long as it is a monomer copolymerizable with CTFE and TFE. Examples thereof include ethylene (Et), vinylidene fluoride (VdF), perfluoro (alkylvinylether) (PAVE) represented by $CF_2=CF-ORf^1$ (in the formula, $Rf^1$ representing a C1-C8 perfluoroalkyl group), a vinyl monomer represented by $CX^3X^4=CX^5(CF_2)_nX^6$ (in the formula, $X^3$, $X^4$, and $X^5$ being the same as or different from each other and representing a hydrogen atom or fluorine atom, $X^6$ being a hydrogen atom, fluorine atom, or chlorine atom, and n representing an integer of 1 to 10), and an alkyl perfluoro vinylether derivative represented by $CF_2=CF-OCH_2-Rf^2$ (in the formula, $Rf^2$ representing a C1-C5 perfluoroalkyl group). Among these, the monomer (α) is preferably at least one selected from the group consisting of PAVE, the vinyl monomer, and the alkyl perfluoro vinylether derivative. More preferably, the monomer (α) is at least one selected from the group consisting of PAVE and HFP.

The alkyl perfluoro vinylether derivative preferably has $Rf^2$ representing a C1-C3 perfluoroalkyl group. More preferably, the alkyl perfluoro vinylether derivative is $CF_2=CF-OCH_2-CF_2CF_3$.

The ratio between the CTFE unit and the TFE unit in the CTFE copolymer is CTFE unit/TFE unit=15-90/85-10 (mol %). More preferably, the ratio is CTFE unit/TFE unit=20-90/80-10 (mol %). Still more preferably, the ratio is CTFE unit/TFE unit=15-25/85-75 (mol %).

In the CTFE copolymer, preferably, the total amount of the CTFE unit and the TFE unit is 90 to 99.9 mol % and the amount of the monomer (α) unit is 0.1 to 10 mol %. If the amount of the monomer (α) unit is less than 0.1 mol %, the fluoropolymer composition tends to have poor formability, environmental stress crack resistance, and fuel crack resistance. In contrast, if the amount of the monomer (α) unit is more than 10 mol %, the fluororesin layer (B) tends to have insufficiently-low fuel permeability, and have poor thermal resistance, and mechanical properties.

The fluoropolymer (b1) is most preferably PCTFE or a CTFE-TFE-PAVE copolymer. The CTFE-TFE-PAVE copolymer is substantially a copolymer consisting only of CTFE, TFE, and PAVE. PCTFE and the CTFE-TFE-PAVE copolymer each have no hydrogen atom directly bonded to a carbon atom constituting a main chain so that dehydrofluorination reaction does not progress. Accordingly, a conventional method for improving the adhesiveness cannot be employed which utilizes an unsaturated bond formed in the fluoropolymer by dehydrofluorination reaction. In the present invention, the rubber layer (A) is a layer made of a fluororubber composition for vulcanization having a predetermined composition. Therefore, adhesion between the layer (A) and the layer (B) is strong even when the fluororesin layer (B) is made of the CTFE-TFE-PAVE copolymer.

Examples of the PAVE include perfluoro (methylvinylether) (PMVE), perfluoro(ethylvinylether) (PEVE), perfluoro(propylvinylether) (PPVE), and perfluoro(butylvinylether). Among these, the PAVE is preferably at least one selected from the group consisting of PMVE, PEVE, and PPVE.

The amount of the PAVE unit is preferably not smaller than 0.5 mol % and not larger than 5 mol % of all the monomer units.

The constitutional units such as a CTFE unit are quantified by $^{19}$F-NMR analysis.

The fluoropolymer (b1) may have at least one reactive functional group selected from the group consisting of a carbonyl group, a hydroxyl group, a heterocyclic group, and an amino group, at a main chain terminal and/or a side chain of the polymer.

In the present description, "a carbonyl group" is a divalent carbon group constituted by a carbon-oxygen double bond and is exemplified by a group represented by —C(=O)—. The reactive functional group such as the carbonyl group is not particularly limited, and examples thereof include a group containing a carbonyl group as a part of the chemical structure, such as a carbonate group, a carboxylic halide group (halogenoformyl group), a formyl group, a carboxyl group, an ester bond (—C(=O)O—), an acid anhydride bond (—C(=O)O—C(=O)—), an isocyanate group, an amide group, an imide group (—C(=O)—NH—C(=O)—), an urethane bond (—NH—C(=O)O—), a carbamoyl group (NH$_2$—C(=O)—), a carbamoyloxy group (NH$_2$—C(=O)O—), an ureide group (NH$_2$—C(=O)—NH—), and an oxamoyl group (NH$_2$—C(=O)—C(=O)—).

In a group such as an amide group, an imide group, a urethane bond, a carbamoyl group, a carbamoyloxy group, an ureide group, and an oxamoyl group, a hydrogen atom bonded to a nitrogen atom may be substituted by a hydrocarbon group such as an alkyl group.

Preferable examples of the reactive functional group include an amide group, a carbamoyl group, a hydroxyl group, a carboxyl group, a carbonate group, a carboxylic halide group, and an acid anhydride bond, because they can be easily introduced and the fluoropolymer (b1) is allowed to have appropriate thermal resistance and fine adhesiveness at comparatively low temperature. Further, the reactive functional group is more preferably an amide group, carbamoyl group, hydroxyl group, carbonate group, carboxylic halide group, and acid anhydride bond.

Especially, one containing a carbonate group and/or a carboxylic halide group disclosed in WO 99/45044 is particularly preferable.

The fluoropolymer (b1) may be a polymer having a reactive functional group at either a main chain terminal or a side chain, or a polymer having a reactive functional group at both a main chain terminal and a side chain. In the case where the reactive functional group is at the main chain terminal, both terminals of the main chain may have the reactive functional groups or only one terminal may have the reactive functional group. In the case where the reactive functional group has an ether bond, the reactive functional group may be additionally contained in the main chain.

The fluoropolymer (b1) is preferably a polymer having a reactive functional group at a main chain terminal, because such a polymer does not significantly deteriorate the mechanical properties and chemical resistance or because it is advantageous in terms of productivity and cost.

The number of the reactive functional groups may be appropriately determined in accordance with the kind, shape, purpose of adhesion, application, required adhesiveness of the rubber layer to be laminated, and a method to adhere the rubber layer with an adjacent layer.

The number of the reactive functional groups at a main chain terminal and/or a side chain is preferably 3 to 800 for each $1 \times 10^6$ of carbon atoms in the main chain. If the number is smaller than 3, the adhesiveness may be lowered. The lower limit is more preferably 15, still more preferably 30, and particularly preferably 120. The upper limit thereof is preferably 200, for example, in terms of productivity.

The number of the reactive functional groups at the terminal is obtained by the following procedures. The fluoropolymer (b1) in powder form is compression-formed at a forming temperature that is 50° C. higher than the melting point of the fluoropolymer (b1) and at a forming pressure of 5 MPa to give a film sheet having a thickness of 0.25 to 0.30 mm. The infrared absorption spectrum of the film sheet is obtained by using an infrared spectrophotometer. The obtained infrared absorption spectrum is compared with that of a known film so that the characteristic absorption of the reactive functional group is determined. The number of the reactive functional groups at the terminal can be calculated based on each difference spectrum using the following formula.

The number of terminal groups (for each $1 \times 10^6$ of carbon atoms)=$(I \times K)/t$ I: absorption of light
K: correction factor
t: film thickness (mm)

Table 1 shows the correction factors of the terminal reactive functional groups as targets.

TABLE 1

| Terminal group | Absorption frequency (cm$^{-1}$) | Correction factor |
| --- | --- | --- |
| —OC(=O)O—R | 1817 | 1426 |
| —COF | 1884 | 405 |

TABLE 1-continued

| Terminal group | Absorption frequency (cm$^{-1}$) | Correction factor |
|---|---|---|
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors shown in Table 1 are determined based on the infrared absorption spectrum of a model compound for determining the number of terminal groups for each 1×10$^6$ of carbon atoms in the main chain.

A method for introducing the reactive functional group to the main chain terminal and/or the side chain may be a method in which a monomer (β) containing a reactive functional group is copolymerized and introduced, a method utilizing as a polymerization initiator a compound having or generating a reactive functional group, a method utilizing as a chain transfer agent a compound having or generating a reactive functional group, a method of introducing a reactive functional group to a fluoropolymer by a polymer reaction, and a method using these methods in combination.

The monomer (β) containing a reactive functional group in the case where a reactive functional group is introduced by copolymerization is not particularly limited, as long as it is a monomer copolymerizable with a monomer to be a part of a fluorine-containing polymer (b1) and has the reactive functional group. Specifically, the following monomers may be exemplified.

First example of the monomer (β) is aliphatic unsaturated carboxylic acids disclosed in WO 2005/100420. The unsaturated carboxylic acids preferably contain at least one polymerizable carbon-carbon unsaturated bond in the molecule and at least one carbonyl oxy group (—C(=O)—O—) in the molecule.

The aliphatic unsaturated carboxylic acid may be an aliphatic unsaturated monocarboxylic acid or an aliphatic unsaturated polycarboxylic acid having two or more carboxyl groups. Examples thereof include C3-C6 unsaturated aliphatic monocarboxylic acids such as (meth)acrylic acids and crotonic acid.

Examples of the aliphatic unsaturated polycarboxylic acids include C3-C6 unsaturated aliphatic polycarboxylic acids such as maleic acid, fumaric acid, itaconic acid, citraconic acid, measaconic acid, aconitic acid, maleic anhydride, itaconic anhydride and citraconic anhydride.

Second example of the monomer (β) is an unsaturated compound represented by the formula: CX$^7_2$=CY$^1$—(Rf$^4$)$_n$—Z$^1$ (in the formula, Z$^1$ representing the reactive functional group, X$^7$ and Y$^1$ being the same as or different from each other and each representing a hydrogen atom or fluorine atom; Rf$^4$ representing a C1-C40 alkylene group, C1-C40 fluorooxyalkylene group, C2-C40 fluoroalkylene group having an ether bond, or C2-C40 fluorooxyalkylene group having an ether bond, n representing 0 or 1).

The amount of the functional group-containing monomer (β) to be introduced by copolymerization is preferably not smaller than 0.05 mol %, and more preferably not smaller than 0.1 mol %. If the amount is too large, gelation or vulcanization reaction may easily occur during melting by heating. Therefore, the upper limit of the amount is preferably 5 mol % and more preferably 3 mol %.

The fluoropolymer (b1) may have a heterocyclic group or amino group at a main chain terminal or a side chain of the polymer.

The heterocyclic group is a group having a hetero atom (e.g. nitrogen atom, sulfur atom, oxygen atom) in a ring of the heterocyclic moiety. The ring may be a saturated ring or unsaturated ring, and may be a monocycle or fused ring. Especially, the heterocyclic group is preferably an oxazolyl group.

The amino group is a monovalent functional group obtained by removing hydrogen from ammonium, or a primary or secondary amine. Specifically, the amino group is represented by a formula: —NR$^4$R$^5$ (in the formula, R$^4$ and R$^5$ being the same as or different from each other and each representing a hydrogen atom or a C1-C20 monovalent organic group). Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The fluoropolymer (b1) is obtainable by a conventionally known polymerization method such as suspension polymerization, solution polymerization, emulsion polymerization, and bulk polymerization. In the polymerization, various conditions such as temperature and pressure, and the polymerization initiator and other additives may be appropriately determined in accordance with the composition or the amount of the fluoropolymer (b1).

The melting point of the fluoropolymer (b1) is not particularly limited, and is preferably 160° C. to 270° C.

The melting point of the fluoropolymer (b1) is obtained as a temperature corresponding to the maximum value in the melting heat curve measured at a temperature rise of 10° C./min. using a DSC device (product of Seiko Instruments Inc.). The MFR is obtained by measuring the weight (g) of the polymer exiting from the nozzle having a diameter of 2 mm and a length of 8 mm in a unit time (10 minutes) under a load of 5 kg at various temperatures with use of a melt indexer (product of TOYO SEIKI SEISAKU-SHO, LTD.).

The molecular mass of the fluoropolymer (b1) is preferably within a range that allows the obtained molded products to have fine mechanical properties and lower fuel permeability. For example, in the case where the melt flow rate (MFR) is set as an index of the molecular mass, the MFR is preferably 0.5 to 100 g/10 min. at an optional temperature within a range of about 230° C. to 350° C. which is a range of the common forming temperature of the fluoropolymers.

The fluororesin layer (B) in the present invention may contain one of these fluoropolymers (b1) or two or more of these fluoropolymers (b1).

In the case where the laminate of the present invention is used as a material for the fuel field, the fluororesin layer (B) in the laminate preferably has fuel permeability coefficient of 10 g·mm/m$^2$/day or less, more preferably 1.0 g·mm/m$^2$/day or less, and still more preferably 0.5 g·mm/m$^2$/day or less.

The fuel permeability coefficient is obtained by the following procedures. Namely, a sheet made of a resin to be measured is placed in a cup for the fuel permeability coefficient measurement containing a mixed solvent of isooctane:toluene:ethanol=45:45:10 (volume ratio). The mass change was measured at 60° C. Based on the measured value, the fuel permeability coefficient is calculated.

In the present invention, the fluoropolymer (b1) having a specific reactive functional group at the terminal improves the adhesion of the fluororesin layer (B) with the rubber layer (A). Accordingly, it is possible to provide molded products (e.g. fuel tank) having excellent impact resistance and strength.

In the case of being a perhalopolymer, the fluoropolymer (b1) has more excellent chemical resistance and lower fuel permeability. The perhalopolymer is a polymer in which halogen atoms are bonded to all the carbon atoms constituting the main chain of the polymer.

In accordance with purposes and applications, the fluororesin layer (B) may further contain various fillers such as inorganic powder, glass fibers, carbon powder, carbon fibers, and metal oxides, as far as they do not impair the performance.

For example, with an aim of further lowering the fuel permeability, the fluororesin layer (B) may contain smectite layered clay minerals, such as montmorillonite, beidellite, saponite, nontronite, hectorite, sauconite, and stevensite, and/or fine layered minerals having high aspect ratio such as mica.

With an aim of providing conductivity, conductive filler may be added. The conductive filler is not particularly limited, and examples thereof include a powdery or fibrous conductive elementary substance such as metals and carbons, powder of conductive compounds such as zinc oxide, and powder provided with electric conductivity by a surface treatment. In the case where conductive filler is added, the fluoropolymer composition is preferably melted and compounded and formed into a pellet in advance.

The powdery or fibrous conductive elementary substance is not particularly limited, and examples thereof include: metal powders of copper and nickel; metal fibers of iron and stainless steel; carbon black, carbon fibers, and carbon fibrils disclosed in JP-A 3-174018.

The powder provided with electric conductivity by a surface treatment is a powder obtained by conducting treatment for imparting the conductivity to the surface of a nonconductive powder such as glass beads and titanium oxide.

The method of imparting the conductivity to the surface is not particularly limited, and may be metal sputtering, electroless deposition, or the like.

Carbon black, among the conductive fillers, is favorably used because it is advantageous in terms of the economic efficiency and prevention of static charge build-up.

The volume resistivity of the fluoropolymer composition containing a conductive filler is preferably $1 \times 10^0$ to $1 \times 10^9$ Ω·cm. More preferably, the lower limit is $1 \times 10^2$ Ω·cm and the upper limit is $1 \times 10^8$ Ω·cm.

In addition to the fillers, optional additives such as heat stabilizers, stiffeners, UV absorbents, and pigments may be added.

The laminate of the present invention is produced by lamination of the rubber layer (A) and the fluororesin layer (B). In the laminate of the present invention, the rubber layers (A) may be laminated on both faces of the fluororesin layer (B). Or alternatively, the fluororesin layers (B) may be laminated on both faces of the rubber layer (A).

Lamination of the rubber layer (A) and the fluororesin layer (B) may be carried out by any method such as a method of laminating the rubber layer (A) and the fluororesin layer (B), which have been separately formed, by pressure bonding and the like, a method of laminating the rubber layer (A) and the fluororesin layer (B) by simultaneously forming the both layers, and a method of applying the fluororesin layer (B) composition to the rubber layer (A).

In the method of laminating the rubber layer (A) and the fluororesin layer (B), which have been separately formed, by pressure bonding and the like, different methods may be employed to form layers respectively for the fluoropolymer and the rubber composition for vulcanization.

Formation of the rubber layer (A) may be carried out by shaping the rubber composition for vulcanization into various shapes such as a sheet and a tube by heat compression molding, transfer molding, extrusion, injection, calendering, coating, or the like.

The fluororesin layer (B) may be formed by heat compression molding, melt-extrusion, injection, coating (including powder coating), or the like. Forming may be carried out by using a common forming machine for fluoropolymers such as an injection machine, a blow molding machine, an extrusion machine, and various coating machines. With such a machine, it is possible to produce laminates having various shapes such as a sheet and a tube. Among these methods, melt-extrusion is preferable because of its excellent productivity.

As later described, in the case where another polymer layer (C) is laminated on the fluororesin layer (B), a forming method such as multilayer extrusion, multilayer blow molding, and multilayer injection may be employed to produce multilayer molded products such as multilayer tubes, multilayer hoses, and multilayer tanks.

Examples of the method of laminating the rubber layer (A) and the fluororesin layer (B) by simultaneously forming the both layers include a method of performing forming and laminating at the same time with use of the rubber composition for vulcanization for forming the rubber layer (A) and the fluoropolymer (b1) for forming the fluororesin layer (B) by a method such as multilayer compression molding, multilayer transfer molding, multilayer extrusion, multilayer injection, or doubling. In such a method, the rubber layer (A) as an unvulcanized formed body and the fluororesin layer (B) are laminated. Then, a treatment for firmly adhering the rubber layer (A) and the fluororesin layer (B) is not needed and strong adhesion is advantageously obtained in the subsequent vulcanization step.

The laminate of the present invention may be a laminate of the unylucanized rubber layer (A) and the fluororesin layer (B). Vulcanization of such an unvulcanized laminate gives strong interlayer adhesiveness.

Namely, the present invention also relates to a vulcanized laminate in which a rubber layer (A1) and the fluororesin layer (B) are adhered by vulcanization which is obtained by vulcanizing the unvulcanized laminate of the present invention.

A conventionally known method and conditions may be employed for vulcanizing a rubber composition for vulcanization. Exemplary methods include a method of vulcanizing an unvulcanized laminate over a long period of time and a method in which an unvulcanized laminate is first subjected to a heat treatment as a pretreatment for a comparatively short time (vulcanization being initiated during the pretreatment) and next to the vulcanization treatment over a long period of time. Especially, the method in which an unvulcanized laminate is first subjected to a heat treatment as a pretreatment for a comparatively short time and next to the vulcanization treatment over a long period of time is preferable for the following reasons. Namely, adhesion between the rubber layer (A) and the fluororesin layer (B) is easily obtained in the pretreatment. Further, since vulcanization of the rubber layer (A) starts during the pretreatment and the shape thereof is stabilized, the laminate may be held in various ways during the subsequent vulcanization treatment.

Conditions of the vulcanization treatment are not particularly limited, and common conditions may be employed.

Preferably, vulcanization is performed at 130° C. to 260° C. for 10 minutes to 80 hours by using steam, pressing, oven, air bath, infrared rays, microwave, lead sheathing vulcanization, and the like. More preferably, vulcanization is performed at 160° C. to 230° C. for 20 to 80 hours.

Also, heating conditions during the pretreatment are not particularly limited. Preferably, the pretreatment is performed at 100° C. to 170° C. for 30 seconds to 1 hour by using steam, pressing, an oven, an air bath, infrared rays, microwave, lead sheathing vulcanization, and the like.

In the vulcanized laminate obtained, the vulcanized rubber layer (A) and the fluororesin layer (B) are adhered to each other by vulcanization and the interlayer adhesion between them is strong.

The laminates of the present invention (both the unvulcanized laminate and the vulcanized laminate) each may have a two-layer structure having a rubber layer (A and A1: hereinafter, represented by rubber layer (A)) and the fluororesin layer (B), or a three-layer structure having layers of (A)-(B)-(A) or (B)-(A)-(B). Moreover, it may have a multilayer structure having three or more layers in which a polymer layer (C) other than the rubber layer (A) and the fluororesin layer (B) are adhered to each other.

The polymer layer (C) may be a rubber layer (C1) other than the rubber layer (A), a resin layer (C2) other than the fluororesin layer (B), or a fiber reinforcement layer. In addition, the rubber layer (A) and/or the fluororesin layer (B) may be further laminated by interposing the polymer layer (C).

The rubber layer (C1) is made of a rubber other than the rubber used in the rubber layer (A) that is directly adhered to the fluororesin layer (B), and the rubber may be a fluororubber or a fluorine-free rubber. Specifically, the previously mentioned examples of the unvulcanized rubber (a1) may be used.

Here, the vulcanizing agent (a5) or other compounding agents may be added also to the unvulcanized rubber composition for forming the rubber layer (C1).

The resin layer (C2) may be made of a resin having excellent mechanical strength or a resin having low permeability to fuels and gas (hereinafter, also referred to as low-permeable resins). Specific examples of the resin having excellent mechanical strength include fluororesins (other than the fluororesin (B)), polyamide resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), and polyetherimide resins. Specific examples of the resin having low permeability to fuels and gas include resins containing ethylene/vinyl alcohol copolymers, polyphenylene sulfide resins, polybutylene naphthalate resins, polybutylene terephthalate resins, and polyphthalamide (PPA). Among these, polyamide resins are preferable because of their fine formability and adhesiveness. In the case where a laminate is subjected to vulcanization treatment, the melting point of the resin is preferably higher than the temperature of the heat treatment.

Next, the layer structure of the laminate of the present invention is described.

(1) Two-layer structure including rubber layer (A)-fluororesin layer (B)

This structure is a basic structure. As above described, previously, interlayer adhesion (fluororesin layer-rubber layer) in such a structure is insufficient. Therefore, the additional steps such as a surface treatment on the resin side, additional application of an adhesive between the layers, and fixation by winding a film in a tape form have been conventionally employed, and this has made the procedures complicated. However, according to the present invention, adhesion by vulcanization provides a chemically strong adhesion.

(2) Three-layer structure including rubber layer-fluororesin layer (B)-rubber layer This structure may have layers of (A)-(B)-(A) or (A)-(B)-(C1). In the case where sealability is needed, rubber layers are preferably arranged on both sides of the fluororesin layer (B), for example, at a joint part of a fuel pipe or the like for maintaining the sealability. The rubber layers of the outer and inner layers may be the same as or different from each other.

A fuel pipe is allowed to have enhanced chemical resistance and lower fuel permeability by employing the (A)-(B)-(C1) structure in which the rubber layer (A) is a fluorine-free rubber layer, the rubber layer (C1) is a fluororubber layer, and the fluororubber layer (C1) is an inner layer of the pipe.

(3) Three-layer structure including resin layer-rubber layer (A)-resin layer

This structure may have layers of (B)-(A)-(B) or (B)-(A)-(C2). The resin layers of the outer and inner layers may be the same as or different from each other.

The resin layers arranged on the both sides stabilizes the shape. In addition, such a structure is favorable in the case where the chemical resistance is important. Moreover, in the case where different mechanical properties are required on respective sides, the structure may have layers of (B)-(A)-(C2).

(4) Three-layer structure including resin layer (C2)-fluororesin layer (B)-rubber layer (A).

(5) Three layer structure including fluororesin layer (B)-rubber layer (A)-rubber layer (C1)

(6) Four or more layer structure

Onto the three-layer structures of (2) to (5), an optional rubber layer (A) or (C1), a resin layer (B) or (C2) may be laminated in accordance with the purpose thereof. Further, a layer of a metal foil and the like may be laminated and an adhesive layer may be interposed between the layers except for the rubber layer (A)-fluororesin layer (B) part.

Moreover, a polymer layer (C) may be further laminated to allow a laminate to be a lining.

Here, the thickness, shape and the like of each layer may be appropriately determined in accordance with the purpose and usage patterns.

The laminate of the present invention, especially a vulcanized laminate, has sufficiently low fuel permeability and has excellent thermal resistance, oil resistance, fuel resistance, LLC resistance, and steam resistance. Additionally, such a laminate can withstand applications under severe conditions so as to be applicable in various usages.

For example, the laminate of the present invention is favorably used for seals, bellows, diaphragms, hoses, tubes, and electric cables of gaskets and non-contact and contact type packings (self-seal packing, piston ring, split ring packing, mechanical seal, oil seal, and etc.) which are required to have thermal resistance, oil resistance, fuel resistance, LLC resistance, and steam resistance. They are used for engine body, main engine-driving system, valve gear system, lubricating/cooling system, fuel system, and intake/exhaust system; transmission system of driving gear system; steering system of chassis; braking system; standard electrical parts, electrical parts for control, and accessory electrical parts for automobiles.

Specifically, the laminate of the present invention is usable for the following applications.

In the basic engine, gaskets such as cylinder head gasket, cylinder head covering gaskets, oil pan packing, and general gaskets; seals such as O-rings, packing, and timing belt covering gaskets; hoses such as control hoses; engine mount rubber cushions, and sealing materials for high pressure valves in hydrogen storage systems.

Shaft seals such as crankshaft seal and camshaft seal in the main driving system.

Valve stem seals of engine valves in the valve train system.

Engine oil cooler hoses, oil return hoses, and seal gaskets of engine oil coolers; water hoses around radiators; vacuum pump oil hoses of the vacuum pumps, in the lubrication/cooling system.

Oil seals, diaphragms, and valves of the fuel pumps; fuel hoses such as filler (neck) hoses, fuel supply hoses, fuel return hoses, and vapor (evaporator) hoses; in-tank hoses, filler seals, tank packing, in-tank fuel pump mounting of fuel tanks; tubes and connector O-rings of the fuel line tubes; injector cushion rings, injector sealer rings, injector O-rings, pressure regulator diaphragms, and check valves of fuel injectors; needle valves, accelerating pump pistons, flange gaskets, controlling hoses of carburetors; and valve sheets and diaphragms of combined air control (CAC), in the fuel system.

Intake manifold packing and exhaust manifold packing of manifolds; diaphragms, control hoses, and emission control hoses of EGR (Exhaust gas recirculation); diaphragms of BPT; anti-afterburn valve sheets of AB valves; throttle body packing of throttles; turbo oil hoses (supply), turbo oil hoses (return), turbo air hoses, inter cooler hoses, and turbine shaft seals of turbo chargers, in the intake/exhaust system.

Bearing seals, oil seals, O-rings, packing, tor-con hoses related to transmissions system; mission oil hoses, ATF hoses, O-rings, and packing of AT in the transmission system.

Power steering oil hoses in the steering system.

Breather valves, vacuum valves, and diaphragm of master vacs, piston cups (rubber cups) of master cylinders, oil seals, O-rings, packing, brake fluid hoses, caliper seals, and boots, in the braking system.

Insulation bodies and sheaths of electric cables (harness), and tubes of harness exterior parts, of basic electrical components.

Covering materials for various sensor cables in the control electrical components.

O-rings, packing, and cooler hoses of car air conditioners, wiper blades of exterior equipment, as the equipment electrical components.

Suitable applications other than automotive applications include: packing, O-rings, hoses, other sealing materials, diaphragms, valves for achieving oil resistance, chemical resistance, thermal resistance, steam resistance, or weather resistance in transportation system such as marine vessels and aircrafts; similar packing, O-rings, sealing materials, diaphragms, valves, hoses, rolls, tubes, chemical resistant coatings, and linings in chemical plants; similar packing, O-rings, hoses, sealing materials, belts, diaphragms, valves, rolls, and tubes in food plant equipment and food equipment (including household goods); similar packing, O-rings, hoses, sealing materials, diaphragms, valves, and tubes in nuclear plant equipment; similar packing, O-rings, hoses, sealing materials, diaphragms, valves, rolls, tubes, linings, mandrels, electric cables, flexible joints, belts, rubber plates, weather strips, roll blades in PPC copiers, in common industrial goods. For example, backup rubber materials of a PTFE diaphragm has been problematically worn out or torn during use because of its poor slippage. However, the laminate of the present invention can solve such a problem and is favorably used.

In use as rubber sealing materials for food, the conventional rubber sealing materials problematically have aromatizing properties and rubber chips may be immixed in food. However, the laminate of the present invention can solve such problems and is favorably used. A rubber material may have problematically swelled when used as a sealing material for piping that uses a solvent for rubber sealing materials for medical and chemical application. However, use of the laminate of the present invention in which rubber is coated with the resin can solve such a problem. In common industrial field, the laminate of the present invention is favorably used in rubber rolls, O-rings, packing, sealing materials, and the like, with an aim of enhancing the strength, slippage, chemical resistance, and permeability of the rubber material. Especially, the laminate of the present invention is favorably used in packing of lithium ion battery as it can maintain the chemical resistance and the sealing property at the same time. Additionally, the laminate of the present invention is favorably used in applications requiring the sliding property by low friction.

Fuel pipes made of the laminate of the present invention may be produced by a common method and the method is not particularly limited. The fuel pipes in the present invention include a corrugate tube.

Among these, a fuel pipe made of the above laminate is preferable in terms of the thermal resistance and low fuel permeability.

EXAMPLES

The present invention is now described with reference to Examples, but is not limited only to these Examples.

Hereinafter, a fluororesin used in Examples and Comparative Examples and evaluation methods thereof are described.

(1) Composition of Polymer

The composition was measured by $^{19}$F-NMR analysis.

(2) Melting Point

The melting point was obtained as a temperature corresponding to the maximum value of the melting peaks measured by a SEIKO DSC device (product of Seiko Instruments Inc.) when the temperature was increased at 10° C./min.

(3) MFR (Melt Flow Rate)

The MFR was obtained by measuring the weight (g) of the polymer exiting from the nozzle having a diameter of 2 mm and a length of 8 mm per unit time (10 minutes) under a load of 5 kg at various temperatures with use of a melt indexer (product of TOYO SEIKI SEISAKU-SHO, LTD.).

(4) Measurement of Fuel Permeability Coefficient of Monolayer

Resin pellets were each placed in a die having a diameter of 120 mm and set in a press machine heated to 300° C. The pellets were respectively melted and pressed at a pressure of about 2.9 MPa to give sheets having a thickness of 0.15 mm. The sheets were each placed in a SUS 316 cup for the fuel permeability coefficient measurement (40 mm$\phi$ of internal diameter, 20 mm of height) containing 18 mL of CE 10 (fuel containing a mixture of isooctane:toluene=50:50 (volume ratio) added with 10% by volume of ethanol). The mass change was measured at 60° C. for 1000 hours. Based on the time rate of the measured mass change and the surface area and thickness of the sheet in a wetted part, the fuel permeability coefficient (g·mm/m$^2$/day) was calculated.

Table 2 shows fluororesins used in Examples and Comparative Examples.

TABLE 2

|  | Fluoropolymer | Melting point (° C.) | MFR (g/10 min.) (Measured temperature) | Fuel permeability (g·mm/m²/day) | Thickness of fluororesin sheet (μm) |
|---|---|---|---|---|---|
| Fluororesin (1) | CTFE/TFE/PPVE copolymer 21.3/76.3/2.4 (mol %) | 246 | 29.2 (297° C.) | 0.4 | 120 |
| Fluororesin (2) | ETFE (product of Daikin Industries, Ltd., Neoflon EP-7000) | 253 | 20.0 (297° C.) | 2.5 | 120 |
| Fluororesin (3) | ETFE (product of Daikin Industries. Ltd., Neoflon EP-543) | 258 | 6.0 (297° C.) | 2.5 | 100 |
| Fluororesin (4) | EFEP (product of Daikin Industries, Ltd., Neoflon RP-5000) | 195 | 25.0 (265° C.) | 6.5 | 1000 |
| Fluororesin (5) | FEP (product of Daikin Industries, Ltd., Neoflon NP-102) | 260 | 27.0 (297° C.) | 0.4 | 100 |
| Fluororesin (6) | PCTFE (product of Daikin Industries, Ltd., Neoflon M-300) | 210 | — | 4.7 | 100 |

(Rubber composition A to O and a to h for vulcanization)

Materials shown in Tables 3 and 4 were separately compounded using a 8-inch open roll mixer to give rubber compositions A to 0 and a to h in a sheet shape having a thickness of about 3 mm. Numerical values in Tables 3 and 4 are each expressed in units of "part by mass".

The optimal vulcanizing time ($T_{90}$) was determined by measuring a maximum torque value ($M_H$) and a minimum torque value ($M_L$) at 160° C. using a curelastometer type II (model: JSR curelastometer, product of JSR Trading Co., Ltd.) for each of the rubber compositions A to O for vulcanization. Table 5 shows the measurements. Here, $T_{90}$ is calculated using a formula $\{(M_H)-(M_L)\} \times 0.9 + M_L$ and $M_H$ and $M_L$ are measured in accordance with JIS K 6300-2.

TABLE 3

| Compounding agent | Materials | Manufacturer | Rubber composition for vulcanization | | | | | | | |
|---|---|---|---|---|---|---|---|---|---|---|
|  |  |  | A | B | C | D | E | F | G | H |
| Base polymer | NIPOL DN101 | Zeon Corporation | 100.0 | 100.0 | 100.0 | 100.0 | 100.0 | 100.0 | 100.0 | 100.0 |
| Stearic acid | Stearic acid 50S | New Japan Chemical Co., Ltd. | 1.0 | 1.0 | 1.0 | 1.0 | 1.0 | 1.0 | 1.0 | 1.0 |
| MgO | Kyowa Mag #150 | Kyowa Chemical Industry Co., Ltd. | 10.0 | 10.0 | 10.0 | 10.0 | 10.0 | 10.0 | 10.0 | 10.0 |
| ZnO | Zinc oxide #2 | Mmitsui Mining & Smelting Co., Ltd. | — | — | — | — | — | — | — | — |
| DBU naphthoate | DA-500 | Daiso Co., Ltd. | 1.0 | 3.1 | 1.0 | 1.0 | — | 1.0 | 1.0 | 1.0 |
| DBU benzyl chloride | DBU-B | Wako Pure Chemical Industries., Ltd. | 2.1 | — | — | — | 1.5 | 2.1 | 2.1 | 2.1 |
| DBU orthophthalate | SA-810 | SAN-APRO LIMITED | — | — | 2.1 | — | — | — | — | — |
| DBU phenoxide | SA-1 | SAN-APRO LIMITED | — | — | — | 2.1 | — | — | — | — |
| DBU formate | SA-603 | SAN-APRO LIMITED | — | — | — | — | — | — | — | — |
| DBU octoate | SA-102 | SAN-APRO LIMITED | — | — | — | — | — | — | — | — |
| DBU | DBU | Wako Pure Chemical Industries., Ltd. | — | — | — | — | — | — | — | — |
| Carbon black | SEAST S | TOKAI CARBON CO., LTD. | 50.0 | 50.0 | 50.0 | 50.0 | 50.0 | 50.0 | 50.0 | 50.0 |
| Silica | Carplex 1120 | DSL Japan Co., Ltd. | 20.0 | 20.0 | 20.0 | 20.0 | 20.0 | 20.0 | 20.0 | 20.0 |
| Silica | Nipsil VN3 | TOSOH SILICA CORPORATION | — | — | — | — | — | — | — | — |
| Plasticizer | TP-95 | ROHM ANS HAAS | 25.0 | 25.0 | 25.0 | 25.0 | 25.0 | 25.0 | 25.0 | 25.0 |
| Sulfur | Sulfur powder | Hosoi Chemical Industry Co., Ltd | 1.5 | 1.5 | 1.5 | 1.5 | 1.5 | 1.5 | 1.5 | 1.5 |
| Vulcanizing agent | VULNOC R | OUCHI SHINKO CHEMICAL INDUSTRIAL CO., LTD. | — | — | — | — | — | — | — | — |
| Thiazole vulcanization accelerator | NOCCELER MSA-G | OUCHI SHINKO CHEMICAL INDUSTRIAL CO., LTD. | 1.0 | 1.0 | 1.0 | 1.0 | 1.0 | 1.0 | 1.0 | 1.0 |
| Thiazole metal salt | NOCCELER MZ | OUCHI SHINKO CHEMICAL INDUSTRIAL CO., LTD. | 0.2 | 0.2 | 0.2 | 0.2 | 0.2 | — | — | — |
| Metal carbamate | NOCCELER PZ | OUCHI SHINKO CHEMICAL INDUSTRIAL CO., LTD. | — | — | — | — | — | — | 0.2 | — |
| Metal carbamate | NOCCELER EZ | OUCHI SHINKO CHEMICAL INDUSTRIAL CO., LTD. | — | — | — | — | — | — | — | 0.2 |

TABLE 3-continued

| Metal carbamate | NOCCELER BZ | OUCHI SHINKO CHEMICAL INDUSTRIAL CO., LTD. | — | — | — | — | — | — | — | 0.2 |

| | | | Rubber composition for vulcanization | | | | | | |
|---|---|---|---|---|---|---|---|---|---|
| Compounding agent | Materials | Manufacturer | I | J | K | L | M | N | O |
| Base polymer | NIPOL DN101 | Zeon Corporation | 100.0 | 100.0 | 100.0 | 100.0 | 100.0 | 100.0 | 100.0 |
| Stearic acid | Stearic acid 50S | New Japan Chemical Co., Ltd. | 1.0 | 1.0 | 1.0 | 1.0 | 1.0 | 1.0 | 1.0 |
| MgO | Kyowa Mag #150 | Kyowa Chemical Industry Co., Ltd. | 10.0 | 10.0 | 10.0 | 10.0 | 10.0 | 10.0 | 10.0 |
| ZnO | Zinc oxide #2 | Mmitsui Mining & Smelting Co., Ltd. | — | — | — | — | — | — | — |
| DBU naphthoate | DA-500 | Daiso Co., Ltd. | 1.0 | — | — | — | 1.0 | — | — |
| DBU benzyl chloride | DBU-B | Wako Pure Chemical Industries., Ltd. | 2.1 | — | — | — | 2.1 | — | — |
| DBU orthophthalate | SA-810 | SAN-APRO LIMITED | — | 2.0 | — | — | — | — | — |
| DBU phenoxide | SA-1 | SAN-APRO LIMITED | — | — | 2.0 | — | — | — | — |
| DBU formate | SA-603 | SAN-APRO LIMITED | — | — | — | — | — | 2.0 | 1.5 |
| DBU octoate | SA-102 | SAN-APRO LIMITED | — | — | — | — | — | — | — |
| DBU | DBU | Wako Pure Chemical Industries., Ltd. | — | — | — | 1.5 | — | — | — |
| Carbon black | SEAST S | TOKAI CARBON CO., LTD. | 50.0 | 50.0 | 50.0 | 50.0 | 50.0 | 50.0 | 50.0 |
| Silica | Carplex 1120 | DSL Japan Co., Ltd. | — | 20.0 | 20.0 | 20.0 | 20.0 | 20.0 | 20.0 |
| Silica | Nipsil VN3 | TOSOH SILICA CORPORATION | 20.0 | — | — | — | — | — | — |
| Plasticizer | TP-95 | ROHM ANS HAAS | 25.0 | 25.0 | 25.0 | 25.0 | 25.0 | 25.0 | 25.0 |
| Sulfur | Sulfur powder | Hosoi Chemical Industry Co., Ltd | 1.5 | 1.5 | 1.5 | 1.5 | 1.5 | 1.5 | 1.5 |
| Vulcanizing agent | VULNOC R | OUCHI SHINKO CHEMICAL INDUSTRIAL CO., LTD. | — | — | — | — | — | — | — |
| Thiazole vulcanization accelerator | NOCCELER MSA-G | OUCHI SHINKO CHEMICAL INDUSTRIAL CO., LTD. | 1.0 | 1.0 | 1.0 | 1.0 | 1.0 | 1.0 | 1.0 |
| Thiazole metal salt | NOCCELER MZ | OUCHI SHINKO CHEMICAL INDUSTRIAL CO., LTD. | 0.2 | 0.2 | 0.2 | 0.2 | — | 0.2 | 0.2 |
| Metal carbamate | NOCCELER PZ | OUCHI SHINKO CHEMICAL INDUSTRIAL CO., LTD. | — | — | — | — | — | — | — |
| Metal carbamate | NOCCELER EZ | OUCHI SHINKO CHEMICAL INDUSTRIAL CO., LTD. | — | — | — | — | — | — | — |
| Metal carbamate | NOCCELER BZ | OUCHI SHINKO CHEMICAL INDUSTRIAL CO., LTD. | — | — | — | — | — | — | — |

TABLE 4

| | | | Rubber composition for vulcanization | | | | | | | |
|---|---|---|---|---|---|---|---|---|---|---|
| Compounding agent | Materials | Manufacturer | a | b | c | d | e | f | g | h |
| Base polymer | NIPOL DN101 | Zeon Corporation | 100.0 | 100.0 | 100.0 | 100.0 | 100.0 | 100.0 | 100.0 | 100.0 |
| Stearic acid | Stearic acid 50S | New Japan Chemical Co., Ltd. | 1.0 | 1.0 | 1.0 | 1.0 | 1.0 | 1.0 | 1.0 | 1.0 |
| MgO | Kyowa Mag #150 | Kyowa Chemical Industry Co., Ltd. | 10.0 | 10.0 | 10.0 | 10.0 | 10.0 | — | 10.0 | — |
| ZnO | Zinc oxide #2 | Mitsui Mining & Smelting Co., Ltd. | — | — | — | — | — | 5.0 | — | 5.0 |
| DBU naphthoate | DA-500 | Daiso Co., Ltd. | 1.0 | — | — | — | — | 1.0 | 1.0 | — |
| DBU benzyl chloride | DBU-B | Wako Pure Chemical Industries., Ltd. | — | 1.0 | — | — | — | 2.1 | 1.9 | 2.0 |
| DBU orthophthalate | SA-810 | SAN-APRO LIMITED | — | — | 1.0 | — | — | — | — | — |
| DBU phenoxide | SA-1 | SAN-APRO LIMITED | — | — | — | 1.0 | — | — | — | — |
| DBU formate | SA-603 | SAN-APRO LIMITED | — | — | — | — | — | — | — | — |
| DBU octoate | SA-102 | SAN-APRO LIMITED | — | — | — | — | 1.0 | — | — | — |
| DBU | DBU | Wako Pure Chemical Industries., Ltd. | — | — | — | — | — | — | — | — |
| Carbon black | SEAST S | TOKAI CARBON CO., LTD. | 50.0 | 50.0 | 50.0 | 50.0 | 50.0 | 50.0 | 50.0 | 50.0 |

TABLE 4-continued

| Compounding agent | Materials | Manufacturer | Rubber composition for vulcanization | | | | | | | |
|---|---|---|---|---|---|---|---|---|---|---|
| | | | a | b | c | d | e | f | g | h |
| Silica | Carplex 1120 | DSL Japan Co., Ltd. | 20.0 | 20.0 | 20.0 | 20.0 | 20.0 | 20.0 | — | 20.0 |
| Silica | Nipsil VN3 | TOSOH SILICA CORPORATION | — | — | — | — | — | — | — | — |
| Plasticizer | TP-95 | ROHM AND HAAS | 25.0 | 25.0 | 25.0 | 25.0 | 25.0 | 25.0 | 25.0 | 25.0 |
| Sulfur | Sulfur powder | Hosoi Chemical Industry Co., Ltd. | 1.5 | 1.5 | 1.5 | 1.5 | 1.5 | 1.5 | 1.5 | 1.5 |
| Vulcanizing agent | VULNOC R | OUCHI SHINKO CHEMICAL INDUSTRIAL CO., LTD. | — | — | — | — | — | — | — | — |
| Thiazole vulcanization accelerator | NOCCELER MSA-G | OUCHI SHINKO CHEMICAL INDUSTRIAL CO., LTD. | 1.0 | 1.0 | 1.0 | 1.0 | 1.0 | 1.0 | 1.0 | 1.0 |
| Thiazole metal salt | NOCCELER MZ | OUCHI SHINKO CHEMICAL INDUSTRIAL CO., LTD. | 0.2 | 0.2 | 0.2 | 0.2 | 0.2 | 0.2 | 0.2 | 0.2 |
| Metal carbamate | NOCCELER PZ | OUCHI SHINKO CHEMICAL INDUSTRIAL CO., LTD. | — | — | — | — | — | — | — | — |
| Metal carbamate | NOCCELER EZ | OUCHI SHINKO CHEMICAL INDUSTRIAL CO., LTD. | — | — | — | — | — | — | — | — |
| Metal carbamate | NOCCELER BZ | OUCHI SHINKO CHEMICAL INDUSTRIAL CO., LTD. | — | — | — | — | — | — | — | — |

TABLE 5

| | Rubber composition for vulcanization | | | | | | | | | | | | | | |
|---|---|---|---|---|---|---|---|---|---|---|---|---|---|---|---|
| | A | B | C | D | E | F | G | H | I | J | K | L | M | N | O |
| $M_L(N)$ | 1.4 | 1.8 | 2.0 | 2.0 | 2.0 | 1.2 | 1.5 | 1.5 | 2.0 | 1.0 | 2.0 | 1.5 | 2.9 | 2.3 | 2.9 |
| $M_H(N)$ | 16.7 | 16.2 | 15.7 | 13.7 | 16.7 | 16.7 | 12.7 | 16.2 | 16.7 | 16.7 | 14.7 | 13.7 | 20.6 | 18.4 | 21.1 |
| $T_{90}(min)$ | 15.0 | 17.0 | 12.0 | 12.0 | 10.5 | 13.0 | 13.0 | 14.0 | 12.0 | 13.0 | 14.0 | 13.0 | 9.0 | 14.0 | 10.0 |

Measurement of $T_{90}$ clarified that the rubber composition E for vulcanization containing DBU-B and the rubber composition O for vulcanization containing DBU formate had short $T_{90}$, though the DBU-B content and the DBU formate content were small. They were especially excellent in vulcanization properties.

Examples 1 to 16 and Comparative Examples 1 to 12

A sheet (about 3 mm thick) of a rubber composition for vulcanization shown in Table 3 or 4 and a fluororesin sheet having a thickness shown in Table 2 were stacked with a fluororesin film (10 μm thick, product of Daikin Industries, ltd., trade name: Polyflon PTFE M731 skive film) having a width of about 10 to 15 mm interposed therebetween on one end portion. The stack was inserted into a die containing a metal spacer so as to make a sheet having a thickness of 2 mm, and was pressed at 160° C. for 45 minutes to give a sheet-shaped laminate. The obtained laminate was cut into three sets of strip specimens (10 mm width X$^{40}$ mm length) each with a grip that is a part where the fluororesin sheet is peeled. The adhesion strength of the specimens was measured by performing a peeling test at a tensile speed of 50 ram/min. at 25° C. using an autograph (product of Shimadzu Corporation, AGS-J 5kN) in accordance with the method disclosed in JIS-K-6256 (Adhesion test of cross-linked rubber). The average value of the obtained data (N=3) was calculated and determined as the adhesion strength. Further, the detachment was observed and evaluated based on the following criteria. Table 6 shows the results.

(Evaluation of Adhesion)

Good: Material corruption of the rubber layer or the fluororesin occurred on the interface of the laminate to allow no detachment.

Poor: Detachment comparatively easily occurred on the interface of the laminate.

TABLE 6

| | Rubber layer | Fluororesin layer | Adhesion strength (N/cm) | Evaluation on adhesion |
|---|---|---|---|---|
| Example 1 | A | (1) | 24 | Good |
| Example 2 | B | (1) | 21 | Good |
| Example 3 | C | (1) | 24 | Good |
| Example 4 | D | (1) | 22 | Good |
| Example 5 | E | (1) | 21 | Good |
| Example 6 | F | (1) | 22 | Good |
| Example 7 | G | (1) | 22 | Good |
| Example 8 | H | (1) | 26 | Good |
| Example 9 | I | (1) | 28 | Good |
| Example 10 | J | (1) | 23 | Good |
| Example 11 | K | (1) | 23 | Good |
| Example 12 | L | (1) | 25 | Good |
| Example 13 | M | (1) | 25 | Good |
| Example 14 | E | (6) | 25 | Good |
| Example 15 | N | (1) | 24 | Good |
| Example 16 | O | (1) | 23 | Good |
| Comparative Example 1 | a | (1) | 1 or less | Poor |

TABLE 6-continued

| | Rubber layer | Fluororesin layer | Adhesion strength (N/cm) | Evaluation on adhesion |
|---|---|---|---|---|
| Comparative Example 2 | b | (1) | 16 | Poor |
| Comparative Example 3 | c | (1) | 5 | Poor |
| Comparative Example 4 | d | (1) | 5 | Poor |
| Comparative Example 5 | e | (1) | 1 or less | Poor |
| Comparative Example 6 | f | (1) | 1 or less | Poor |
| Comparative Example 7 | g | (1) | 14 | Poor |
| Comparative Example 8 | A | (2) | 1 or less | Poor |
| Comparative Example 9 | A | (3) | 1 or less | Poor |
| Comparative Example 10 | A | (4) | 1 or less | Poor |
| Comparative Example 11 | A | (5) | 1 or less | Poor |
| Comparative Example 12 | h | (1) | 1 or less | Poor |

Example 17

The rubber composition for vulcanization and the fluororesin were continuously extruded by using an extrusion machine. Here, the inner-layer material was the rubber composition A for vulcanization, the middle-layer material was the fluororesin (1), and the outer-layer material was the rubber composition A for vulcanization. A DAITEPIC mandrel (product of Mitsubishi Cable Industries, Ltd.) having a diameter of 24.4 mm was used as a core material passed along with the materials through the forming line. The molded product obtained by extruding the rubber composition A for vulcanization and the fluororesin (1) was steam vulcanized in a vulcanizing autoclave to give a fuel hose having the above three-layer structure. In addition, CE10 was enclosed in the fuel hose and the permeation coefficient was determined based on the mass change at 60° C. The coefficient was 4.0 g/m$^2$·day.

Conditions for extrusion and for steam vulcanization are listed below.
1) Setting of extruder for inner-layer NBR and outer-layer NBR
Screw temperature: 60° C.
Cylinder 1: 70° C.
Cylinder 2: 70° C.
Head: 80° C.
Thickness of molded product: 2.4 mm (both inner layer and outer layer)
2) Setting of extruder for middle-layer fluororesin
Cylinder 1: 260° C.
Cylinder 2: 265° C.
Cylinder 3: 270° C.
Shell clamp: 270° C.
Neck: 270° C.
Die: 270° C.
Head 270° C.
Thickness of molded product: 0.15 mm
3) Condition for steam vulcanization of molded product 160° C.×60 minutes

INDUSTRIAL APPLICABILITY

The laminate of the present invention, especially the vulcanized laminate, is favorably used for seals, bellows, diaphragms, hoses, tubes, and electric cables of gaskets and non-contact and contact type packings (self-seal packing, piston ring, split ring packing, mechanical seal, oil seal, and etc.) which are required to have thermal resistance, oil resistance, fuel resistance, LLC resistance, and steam resistance. They are used for engine body, main engine-driving system, valve gear system, lubricating/cooling system, fuel system, and intake/exhaust system; transmission system of driving gear system; steering system of chassis; braking system; standard electrical parts, electrical parts for control, and accessory electrical parts for automobiles.

The invention claimed is:

1. A laminate comprising a rubber layer (A) and a fluororesin layer (B) on the rubber layer (A),
wherein the rubber layer (A) is a layer made of a rubber composition for vulcanization,
the rubber composition for vulcanization contains an unvulcanized rubber (a1) which is acrylonitrile-butadiene rubber or its hydride; at least one compound (a2) selected from the group consisting of a 1,8-diazabicyclo(5.4.0)undec-7-ene salt, a 1,5-diazabicyclo(4.3.0)-non-5-ene salt, 1,8-diazabicyclo(5.4.0)undec-7-ene, and 1,5-diazabicyclo(4.3.0)-non-5-ene; magnesium oxide (a3); and silica (a4),
the amount of the compound (a2) is larger than 1.0 part by mass and not larger than 5.0 parts by mass, for each 100 parts by mass of the unvulcanized rubber (a1),
the amount of the magnesium oxide (a3) is 3 to 20 parts by mass, for each 100 parts by mass of the unvulcanized rubber (a1),
the amount of the silica (a4) is 10 to 40 parts by mass for each 100 parts by mass of the unvulcanized rubber (a1),
the fluororesin layer (B) is a layer made of a fluoropolymer composition, and
the fluoropolymer composition contains a fluoropolymer (b1) which is chlorotrifluoroethylene copolymer,
wherein the chlorotrifluoroethylene copolymer contains only a chlorotrifluoroethylene unit, tetrafluoroethylene unit and perfluoro(alkylvinylether) unit,
the ratio between the chlorotrifluoroethylene unit and the tetrafluoroethylene unit in the chlorotrifluoroethylene copolymer is chlorotrifluoroethylene unit/tetrafluoroethylene unit =15-90/85-10 (mol %),
the amount of the perfluoro(alkylvinylether) unit is not smaller than 0.5 mol % and not larger than 5 mol % of all the monomer units.

2. The laminate according to claim 1,
wherein the rubber composition for vulcanization further contains at least one vulcanizing agent (a5) selected from the group consisting of a sulfur vulcanizing agent and a peroxide vulcanizing agent.

3. The laminate according to claim 1,
wherein the rubber composition for vulcanization further contains at least one metal salt (a6) selected from the group consisting of a metal carbamate and a thiazole metal salt.

4. The laminate according to claim 1,
wherein the unvulcanized rubber (a1) is acrylonitrile-butadiene rubber.

5. The laminate according to claim 1,
wherein the compound (a2) is at least one compound selected from the group consisting of 1,8-diazabicyclo(5.4.0)undec-7-ene, 1,8-benzyl-1,8-diazabicyclo(5.4.0)-7-undecenium chloride, 1,8-diazabicyclo(5.4.0) undec-7-ene naphthoate, 1,8-diazabicyclo(5.4.0)undec- 7-ene phenoxide, 1,8-diazabicyclo(5.4.0)undec-7-ene orthophthalate, and 1,8-diazabicyclo(5.4.0)undec-7-ene formate.

6. The laminate according to claim 1,
wherein the rubber layer (A) is laminated on both faces of the fluororesin layer (B).

7. The laminate according to claim 1,
wherein the fluororesin layer (B) is laminated on both faces of the rubber layer (A).

8. The laminate according to claim 1, further comprising a polymer layer (C) other than the rubber layer (A) and the fluororesin layer (B), on the rubber layer (A) or the fluororesin layer (B).

9. A laminate obtained by vulcanizing the laminate according to claim 1,
wherein a vulcanized rubber layer (A 1) produced from the rubber layer (A) and the fluororesin layer (B) are adhered by vulcanization.

* * * * *